United States Patent
Tschöpe

[11] Patent Number: 6,112,597
[45] Date of Patent: Sep. 5, 2000

[54] CIRCUIT BOARD CONNECTION FOR A PRESSURE SENSOR USED IN MINING HYDRAULICS

[75] Inventor: Jürgen Tschöpe, Selm, Germany

[73] Assignee: DBT Automation GmbH, Essen, Germany

[21] Appl. No.: 08/923,764

[22] Filed: Sep. 2, 1997

[51] Int. Cl.[7] ...................................... G01L 7/00
[52] U.S. Cl. ............................................... 73/756
[58] Field of Search .................. 338/4, 5, 42; 73/712, 73/716, 720, 721, 756

[56] References Cited

U.S. PATENT DOCUMENTS

| | | | |
|---|---|---|---|
| 4,379,279 | 4/1983 | Nasiri . | |
| 4,695,817 | 9/1987 | Kurtz et al. | 338/4 |
| 4,986,126 | 1/1991 | Lawless . | |
| 5,134,888 | 8/1992 | Zylka . | |
| 5,461,922 | 10/1995 | Koen | 73/756 |
| 5,554,809 | 9/1996 | Tobita et al. . | |

FOREIGN PATENT DOCUMENTS

| | | |
|---|---|---|
| 0 297 961 | 1/1989 | European Pat. Off. . |
| 3937573 | 5/1991 | Germany . |
| 2 276 245 | 9/1994 | United Kingdom . |
| WO 96/37764 | 11/1996 | WIPO . |

OTHER PUBLICATIONS

UK Search Report dated Jan. 23, 1998.

*Primary Examiner*—William Oen
*Attorney, Agent, or Firm*—Vickers, Daniels & Young

[57] ABSTRACT

Pressure sensor (10) for measuring hydraulic pressures, in particular for use in mining hydraulics, having a hydraulic connection (12) and a hydraulo-electrical pressure transducer (15) which is loaded hydraulically via the said connection, and having a circuit board (18) which processes the electrical measured values from the pressure transducer. In order to ensure a secure fastening of the circuit board to the pressure transducer with, at the same time, easy exchangeability of the board, it is proposed by the invention that the circuit board be screwed to the pressure sensor (10) at a distance from the pressure transducer (15), preferably with at least one spacer (23, 24) interposed.

3 Claims, 1 Drawing Sheet

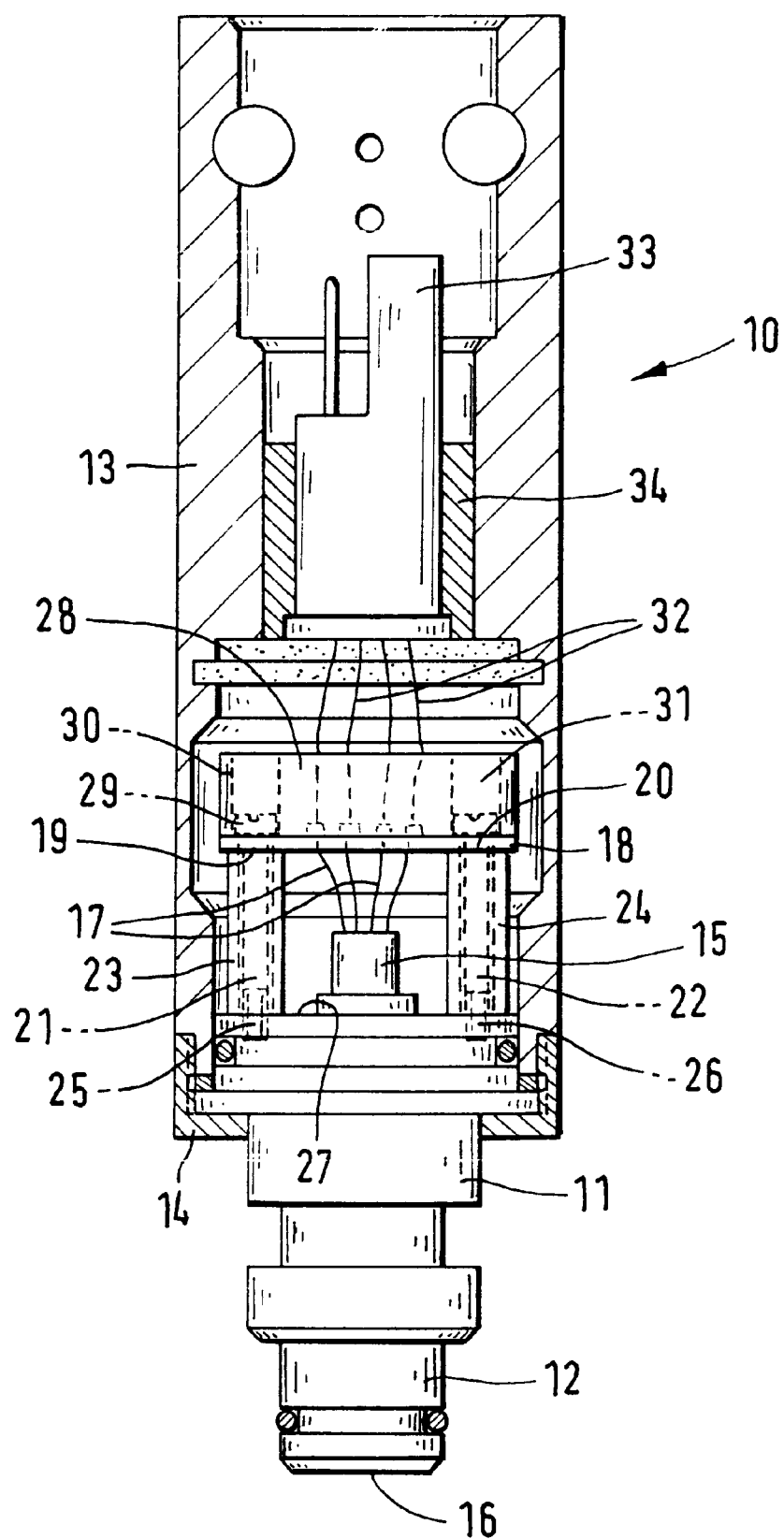

CIRCUIT BOARD CONNECTION FOR A PRESSURE SENSOR USED IN MINING HYDRAULICS

The invention relates to a pressure sensor for measuring hydraulic pressures, in particular for use in mining hydraulics, having a hydraulic connection and a hydraulo-electrical pressure transducer which can be loaded hydraulically via the said connection, and having a circuit board which processes the electrical measured values from the pressure transducer and is connected electrically to the pressure transducer.

A pressure sensor of this type, such as can be used for remote indication of the measured hydraulic pressures, is known from DE 39 37 573. This known pressure sensor, which is configured in the manner of a cartridge, uses as the pressure transducer a metal diaphragm having a strain-gauge arrangement, the measured values supplied by the strain-gauge arrangement being amplified by an amplifier fitted on the circuit board., and these amplified values then being forwarded to the outside from the pressure sensor to an indicating device or to measured-value processing via output lines.

In the case of this known arrangement, the circuit board is soldered to the pressure sensor by electrically conductive supporting elements at a distance above the metal diaphragm, that is to say the supporting elements serve both for the electrical connection of the pressure transducer and circuit board and also for the retention of the same on the pressure sensor. Although the known arrangement has proven to be very reliable, in the case of the high loadings in mining, in particular shock loadings, it repeatedly occurs that the sensitive circuit boards are damaged and have to be exchanged, to which end the old boards first have to be desoldered and the replacement boards have to be newly soldered onto the pressure sensor, for which purpose a comparatively high amount of time and skill is necessary.

The primary object of the invention is to enable easier exchangeability of the circuit board on the pressure sensor, at the same time secure fastening of the circuit board to the pressure sensor being ensured. This object is achieved, with the invention, in that the circuit board is screwed to the pressure sensor at a distance from the pressure transducer. In this case, at least one spacer can expediently be arranged between the pressure sensor and the circuit board, for example two plastic sleeves, through each of which a retaining screw that is put through a drilled hole in the circuit board engages and each of which is screwed to the pressure sensor in a threaded hole.

As a result of the screw connection, the circuit board can be detached from the pressure sensor by simply detaching the retaining screws using the simplest tool, and can be exchanged for a new board. A complicated soldering operation can therefore be dispensed with to a large extent, so that if the circuit board is damaged the pressure sensor is rapidly reusable.

The pressure sensor is preferably essentially designed in two parts, with a plug part having the hydraulic connection and the pressure transducer, and a housing which is screw-connected to the said plug part, the circuit board being arranged on the plug part. In order to exchange the circuit board, the screw connection between the two pressure sensor parts can be detached, the board being exposed directly after the separation of the parts and being able to be unscrewed from the plug part. In order to prevent undesired loosening of the retaining screws during the operation of the pressure sensor, the retaining screws and their screw heads on the circuit board can be covered with silicone or the like. For the further protection of the circuit board, the latter is expediently at least partly provided with a protective covering of synthetic resin or the like, it being possible here to provide cutouts in the protective covering for the screw heads.

The electrical connection between the pressure transducer and the circuit board can be performed via one or more electric leads which are connected to the circuit board in a suitable manner, for example by soldering. From this point of view, it is particularly advantageous if the electric leads are connected to the circuit board via a detachable, electric plug connection, since then, after detaching the retaining screws, the circuit board needs only to be drawn off from the plug part and replaced by a new board. To this end, the plug connection expediently comprises a first connector element arranged on the circuit board and a second connector element (socket), on the plug part, which is aligned with the first connector element and can be joined to the latter to form the plug connection. Using such an arrangement, faulty connections of the circuit board can be ruled out very simply, if by means of the arrangement of the connector elements at most only one possible plug-in position of the board on the plug part is possible.

The housing can be provided with a plug coupling part which is potted therein and which, on the inner side of the housing, is connected to electric output leads of the circuit board, as a result of which in a particularly simple way the electrical contact between the circuit board arranged in the interior of the housing and the indicating or measuring device to be connected thereto outside the housing is possible, which device can simply be connected to the plug coupling part.

Further features and advantages of the invention emerge from the following description and the drawing, in which a preferred embodiment of the invention is explained in more detail using an example.

The FIGURE shows a pressure sensor according to the invention in section.

In the drawing, 10 designates a pressure sensor for hydraulic pressures in the form of a slim, cylindrical cartridge which is essentially designed in two parts, having a plug part 11 having a plug nipple 12 for connection to a hydraulic plug coupling (not illustrated), and having a housing 13 which is screwed on by means of a union nut 14 engaging over the plug part 11.

The plug part 11 is provided with a pressure transducer 15 which converts the pressure fluctuations occurring on the hydraulic side 16 into electrical signals which are then fed via four leads 17 to a circuit board 18. The approximately circular circuit board 18 is provided with two drilled holes 19, 20 which are arranged diametrically opposite each other on the outer edge of the board and through which the retaining screws 21, 22 engage, the said screws being screwed into threaded holes 25, 26 on the inner end face 27 of the plug part 11, with spacers 23, 24 interposed. The spacers comprise plastic sleeves and ensure that the circuit board 18 is located at a distance from the pressure measuring capsule 15. The leads 17 are soldered onto the board; however they can also be provided with plugs, which mount into associated plug mounts, plug openings or the like on the circuit board.

For the purpose of protection against vibration and moisture, the circuit board, which carries a measured value amplifier, is provided with a synthetic resin covering 28 which, in the region of the screw heads 29 of the retaining screws 21, 22, has fitting holes 30. The screw heads 29 which are located in the fitting holes 30 are closed at the top by silicone stoppers 31, which effect additional safeguarding of the screws against undesired detachment.

The circuit board, or the amplifier carried by the latter, is connected on the output side via output leads 32 to a plug coupling part 33, which is potted in the housing 13 using synthetic resin 34. The plug coupling 33 enables the connection of the pressure sensor to a measured-value indicating device or the like, which can be arranged remote from the sensor. The output leads 32 can be soldered to the circuit board like the leads 17 or can be connected via plug contacts, the arrangement of the contacts expediently being made in such a way that there is only one plug-in possibility and erroneous connections are thus ruled out.

It can be seen that the pressure sensor according to the invention is of particularly simple construction, and the circuit board carrying the measured-value amplifier can easily be exchanged if this should be damaged as a result of vibrations or the like. For this purpose, it is simply necessary only to detach the union nut 14 on the housing 13 and to remove the plug part 11 from the latter, whereupon, after the removal of the silicone stoppers, the retaining screws 21, 22 can be unscrewed and the amplifier board can be exchanged after the lead connections 17 and 32 have been interrupted.

What is claimed is:

1. A pressure sensor for measuring hydraulic pressures, in particular for use in mining hydraulics, comprising:

a hydraulic connection;

a hydraulo-electrical pressure transducer which can be loaded hydraulically via the said connection;

a circuit board which processes the electrical measured values from said pressure transducer and is connected electrically to said pressure transducer; and means for attaching said circuit board to said pressure sensor at a spacing from said pressure transducer, said attaching means including a plurality of spacers in the form of sleeves, through each of which is a retaining screw extending through a drilled hole in said circuit board and interengaging a threaded hole in said pressure sensor.

2. The pressure sensor of claim 1, said pressure sensor comprising two parts, with a plug part having the hydraulic connection and the pressure transducer, and with a housing which is screw-connected to said plug part, the circuit board being arranged on said plug part.

3. A pressure sensor according to claim 1, wherein said attaching means includes two plastic sleeves and two drilled holes in said circuit board located diametrically opposite each other.

* * * * *

UNITED STATES PATENT AND TRADEMARK OFFICE
CERTIFICATE OF CORRECTION

PATENT NO.  : 6,112,597
DATED       : September 5, 2000
INVENTOR(S) : Jürgen Tschöpe It is certified that error appears in the above-identified patent and that said Letters Patent is hereby corrected as shown below:

Item [30], Insert -- Foreign Application Priority Data

Sept. 6, 1996    [DE]    Germany 296 15 534.9--.

Signed and Sealed this

First Day of May, 2001

Attest:

NICHOLAS P. GODICI

*Attesting Officer*    *Acting Director of the United States Patent and Trademark Office*